(12) United States Patent
Watson et al.

(10) Patent No.: US 8,941,814 B2
(45) Date of Patent: Jan. 27, 2015

(54) MULTIPLE-BLADE HOLDING DEVICES

(75) Inventors: Douglas C. Watson, Campbell, CA (US); Lorri L. Watson, legal representative, Campbell, CA (US); Fardad Hashemi, Moraga, CA (US); Christopher S. Margeson, Mountain View, CA (US)

(73) Assignee: Nikon Corporation, Tokyo (JP)

( * ) Notice: Subject to any disclaimer, the term of this patent is extended or adjusted under 35 U.S.C. 154(b) by 348 days.

(21) Appl. No.: 13/527,206

(22) Filed: Jun. 19, 2012

(65) Prior Publication Data

US 2012/0320362 A1 Dec. 20, 2012

Related U.S. Application Data

(60) Provisional application No. 61/498,935, filed on Jun. 20, 2011.

(51) Int. Cl.
*F16F 7/08* (2006.01)

(52) U.S. Cl.
CPC .................................... *F16F 7/082* (2013.01)
USPC ............................. 355/72; 355/77

(58) Field of Classification Search
CPC ... F16F 7/082; G03F 7/70716; G03F 7/70725
USPC ............................................. 355/72; 430/320
See application file for complete search history.

(56) References Cited

U.S. PATENT DOCUMENTS

| 7,095,482 B2 | 8/2006 | Phillips et al. | |
|---|---|---|---|
| 2002/0047493 A1* | 4/2002 | Jeong et al. | 310/309 |
| 2003/0030998 A1* | 2/2003 | Mhani et al. | 361/760 |
| 2004/0140733 A1* | 7/2004 | Keller | 310/309 |
| 2010/0116161 A1* | 5/2010 | Shilpiekandula et al. | 101/407.1 |
| 2011/0053092 A1* | 3/2011 | Aoki | 430/319 |

FOREIGN PATENT DOCUMENTS

FR  WO9748920  * 12/1997

* cited by examiner

*Primary Examiner* — Toan Ton
*Assistant Examiner* — Michelle Iacoletti

(57) ABSTRACT

An exemplary device includes first and second portions that are movably connected together by first and second sets, respectively, of multiple blades interleaved with each other at an overlap region. When the overlap region is compressed, displacement of the first and second portions relative to each other is prevented so as to provide relatively high stiffness in first and second orthogonal directions (e.g., z- and y-directions) and relatively low stiffness in a third orthogonal direction (e.g., x-direction). The device can be used in coordination with an actuator, wherein operation of the actuator and compression of the overlap region are automated.

38 Claims, 14 Drawing Sheets

MULTIPLE-BLADE HOLDING DEVICES

CROSS-REFERENCE TO RELATED APPLICATION

This application claims priority to and the benefit of U.S. Provisional Patent Application No. 61/498,935, filed on Jun. 20, 2011, which is incorporated herein by reference in its entirety.

FIELD

This disclosure pertains to, inter alia, devices for holding and/or supporting an object at a desired position in 3-dimensional space.

BACKGROUND

The need to hold one thing relative to another thing is ubiquitous in industry. For example, it is generally very difficult or impossible to perform accurate and precise actions on or with respect to a workpiece if the workpiece cannot be held securely and accurately. Robotics rely extensively on the ability to hold a tool or other process implement relative to the workpiece, hold the workpiece relative to the implement, or both. The demand for holding devices is particularly acute in precision systems.

An example precision system that imposes extremely demanding performance from all its constituent components and assemblies is a microlithography system. Whereas until recently microlithography was directed principally to the manufacture of microcircuits and related devices, it is also an important tool for the manufacture of large panel displays such as liquid crystal displays. So as to be imprinted with a desired pattern of display elements (pixels), a substrate panel is supported on a large platen called a plate holder (PH). The PH is supported by a plate table (PT). The PT functions as a movable stage that can be displaced to any of various positions as the patterns are imprinted on the surface of the substrate panel. The PH functions as a large chuck that holds the substrate panel. The PT and PH can be very large and massive. The PH desirably is supported so that the surface thereof on which the substrate is placed remains substantially planar, without significant sag or other surface deformation resulting from unsupported or improperly supported mass.

Currently, the PH is supported on the PT using bolts placed between the PH and PT at predetermined locations. For adjustability of the flatness of the PH, shims are conventionally inserted between the PT and PH. This adjustment is performed at time of manufacture, at the time of installation, and at other times as required. Unfortunately, this manner of attachment requires substantial manual labor and is difficult and time-consuming to perform. Also, in view of the fact that the PH and PT are normally fabricated of different materials, this mounting and adjustment scheme also does not allow for relief of thermal stresses that otherwise could accumulate in the PH and cause warping or other deformation thereof. Whereas bolts are typically very stiff in the vertical direction, the connections made at the contacts by the bolts are also very stiff in both horizontal directions, particularly when the bolts are tightened. These very high stiffness values do not allow, for example, significant relaxation of a PH experiencing thermal expansion. Finally, whereas use of bolts and shims in this manner can provide stability of the PH, relative to the PT, down to the micrometer range, they are very difficult to adjust.

Therefore, conventional devices and methods for holding a first mass (e.g., a PH or analogous component) relative to a second mass (e.g., a PT or analogous component) do not address the need to provide a combination of stiffness in the vertical direction and in one horizontal direction, flexibility in the other horizontal direction, strength and stability under load, ease of adjustability, accuracy of adjustability in height and angle of the object being held, and capability of being used in conjunction with a mover or actuator operable to change position of the object being held in 3-D space.

SUMMARY

The needs articulated above are supplied by holding devices, as described herein, that comprise first and second portions movably connected together by first and second sets, respectively, of multiple blades interleaved with each other at an overlap region. When the overlay region is compressed, it inhibits motion of the first and second sets relative to each other, to provide the device with relative stiffness in first and second orthogonal directions and relative flexibility in the third orthogonal direction. For example, a device can be placed to support a first mass relative to a second mass, providing (when the overlap region is compressed) relative stiffness of support in the vertical direction (z-direction) and in the x- or y-direction, or combination of the x- and y-directions, and relative flexibility of support in the remaining x- or y-direction, or combination of x- and y-directions. The relative flexibility can be exploited to allow, for example, thermal expansion of the first mass relative to the second mass as the device supports the first mass relative to the second mass.

Compression of the overlap region (using, for example, a clamp) usually produces a large frictional force in the overlap region. When not compressed or at most slightly compressed, the overlap region allows positional and/or angular adjustment of the interleaved sets of blades relative to each other. Compressing the overlap region imposes large frictional forces between the leaves in the overlap region, which increases resistance to displacement of the portions relative to each other, and provides relatively high stiffness in two directions (e.g., x- and z-directions) and relatively low stiffness in the remaining direction (e.g., y-direction).

Timing the compression of the overlap region can be coordinated with operation of an actuator or mover. For example, at least one holding device and at least one mover can be placed between a first mass and a second mass. The mover moves the first mass relative to the second mass when compression is not being applied to the overlap region, and compression is applied to the overlap region when the mover is not being actuated. Thus, the holding device can be used to hold the position of the first mass as established by the mover.

BRIEF DESCRIPTIONS OF THE DRAWINGS

The features and advantages of the invention will be more readily apparent from the detailed description, which proceeds with reference to the accompanying drawings.

DETAILED DESCRIPTION

Figures 1A, 1B:
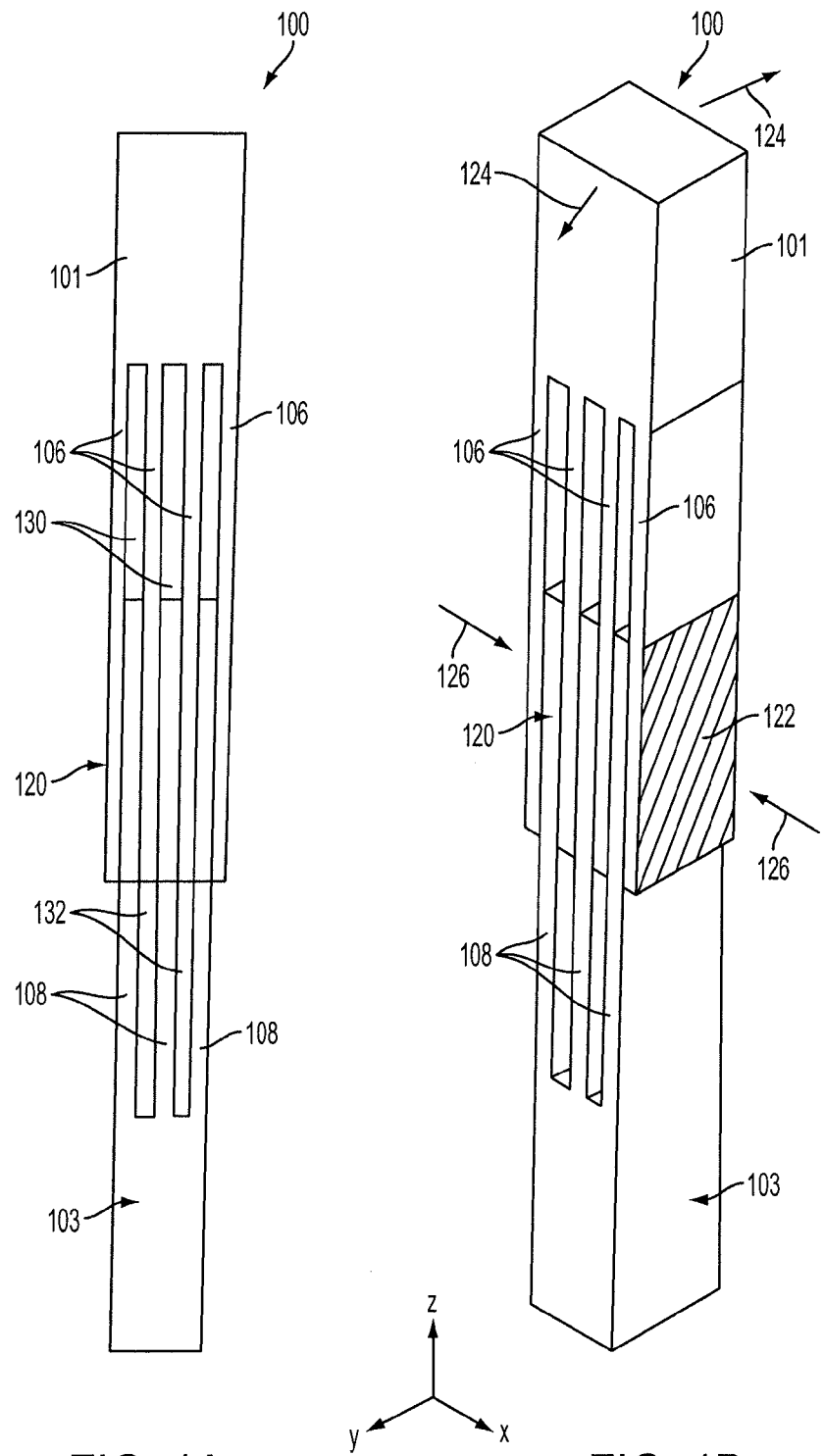
FIG. 1A is an elevational view of a holding device according to an embodiment.
FIG. 1B is an isometric view of the holding device of FIG. 1A.

The invention is described below in the context of multiple exemplary embodiments, which are not intended to be limiting in any way.

The drawings are intended to illustrate the general manner of construction and are not necessarily to scale. In the detailed description and in the drawings themselves, specific illustrative examples are shown and described herein in detail. It will be understood, however, that the drawings and the detailed description are not intended to limit the invention to the particular forms disclosed, but are merely illustrative and intended to teach one of ordinary skill how to make and/or use the invention claimed herein.

As used in this application and in the claims, the singular forms "a," "an," and "the" include the plural forms unless the context clearly dictates otherwise. Additionally, the term "includes" means "comprises." Further, the term "coupled" encompasses mechanical as well as other practical ways of coupling or linking items together, and does not exclude the presence of intermediate elements between the coupled items.

The described things and methods described herein should not be construed as being limiting in any way. Instead, this disclosure is directed toward all novel and non-obvious features and aspects of the various disclosed embodiments, alone and in various combinations and sub-combinations with one another. The disclosed things and methods are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and method. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In the following description, certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

As stated above, conventional devices and methods for holding or supporting a first mass (e.g., a PH or analogous component) relative to a second mass (e.g., a PT or analogous component) do not address the problem of providing: (a) high stiffness in a first orthogonal dimension (e.g., vertical or "z"-direction), (b) high stiffness in a second orthogonal dimension (e.g., "x"-direction) normal to the first direction, (c) flexibility in a third orthogonal dimension (e.g., "y"-direction) normal to the first and second dimensions, (d) adjustability at least in the first dimension, and (e) capability of holding tight positional tolerances (e.g., micrometer range) at least in the first dimension. These features are provided by holding devices according to the invention, as described below, in which the first dimension can be a direction along which a subject device holds or supports a first mass relative to a second mass. Particularly when the devices are used for supporting as well as holding, the first dimension is the z-direction parallel to the direction of gravitational force. The devices can be used in tension as well as compression.

A general configuration of a multi-blade holding device 100 is depicted in FIGS. 1A and 1B. The device 100 comprises a first portion 101 and a second portion 103. The first portion 101 comprises a respective set of multiple blades 106, and the second portion 103 comprises a respective set of multiple blades 108. The ends of the blades 106, 108 are interleaved (interdigitated) with each other to form a blade-overlap region 120. Thus, the first and second portions are connected together via the interleaved blades. The blades 106 of the first portion 101 are separated from each other sufficiently to allow the blades 108 of the second portion to interdigitate with them. Whenever the device 100 is being used to hold an object (or respective portion of an object) at a desired position in three-dimensional space, a compression ("clamping") force 126 is applied to the blade-overlap region 120, generally within the region 122 indicated by hatching in FIG. 1B. Whenever the clamping force 126 is not present or is substantially reduced, the first portion 101 and/or second portion 103 may be displaced (e.g., pivot 124 and/or move in the z-direction) relative to the other portion. Application of a sufficient clamping force 126 at the blade-overlap region 120 prevents such displacement.

The blades 106, 108 allow changes to be made in the position of the first portion 101 relative to the second portion 103 and/or the position of the second portion 103 relative to the first portion 101. In many embodiments (e.g., FIGS. 1A and 1B), the blades 106, 108 are parallel to each other, have greater length than width, and are relatively thin in the thickness dimension (x-direction in FIG. 1B). (For some applications the length and width can be substantially equal.) The blades in the first portion 101 need not have the same shape and/or thickness as the blades in the second portion 103. The blades 106, 108 are substantially parallel to each other and, for most applications, are substantially planar. But, blade planarity is not an absolute requirement.

As noted, compression of the overlap region 120 prevents relative motion of the first and/or second portions 101, 103 of the device 100, and thus prevents corresponding motion of an object being held or supported by the device. An uncompressed overlap region 120 allows relative movement of the first and second portions 101, 103, permitting the position of an object being held by the device to be changed. Subsequent compression of the overlap region 120 holds the first and second portions 101, 103 (and thus the object) at the new position. Compression typically is applied in a direction normal to the planes of the blades in the overlap region 122.

The blades in each portion 101, 103 are separated from each other by respective gaps 130, 132. The width of a gap desirably is equal to the thickness of the respective interleaved blade or can be made slightly thinner or slightly thicker than the thickness of the interleaved blade. Thus, the gaps facilitate interleaving of the blades 106, 108 and displacement of the device portions 101, 103 relative to each other whenever the overlap region 120 is not being compressed. "Adjustability" of the device 100 in at least the first dimension includes placement of, for example, the first portion 101 in a selected first position upon removing or at least reducing compression at the overlap region 120, then applying compression to the overlap region 120 to "hold" the first position, then removing or at least reducing compression at the overlap region while positioning the first portion 101 in a selected second position relative to the second portion 103, and then applying compression to the overlap region 120 to hold the second position. As discussed later below, the device 100 is particularly suitable for use in conjunction with a mover or actuator that is operable to change position of the object (and thus change the relative positions of the first and second portions 101, 103 of the device supporting the object) whenever the overlap region 120 is not being compressed. If desired or required, the mover or actuator can contribute, cooperatively with the device, to holding the object.

Figure 2:
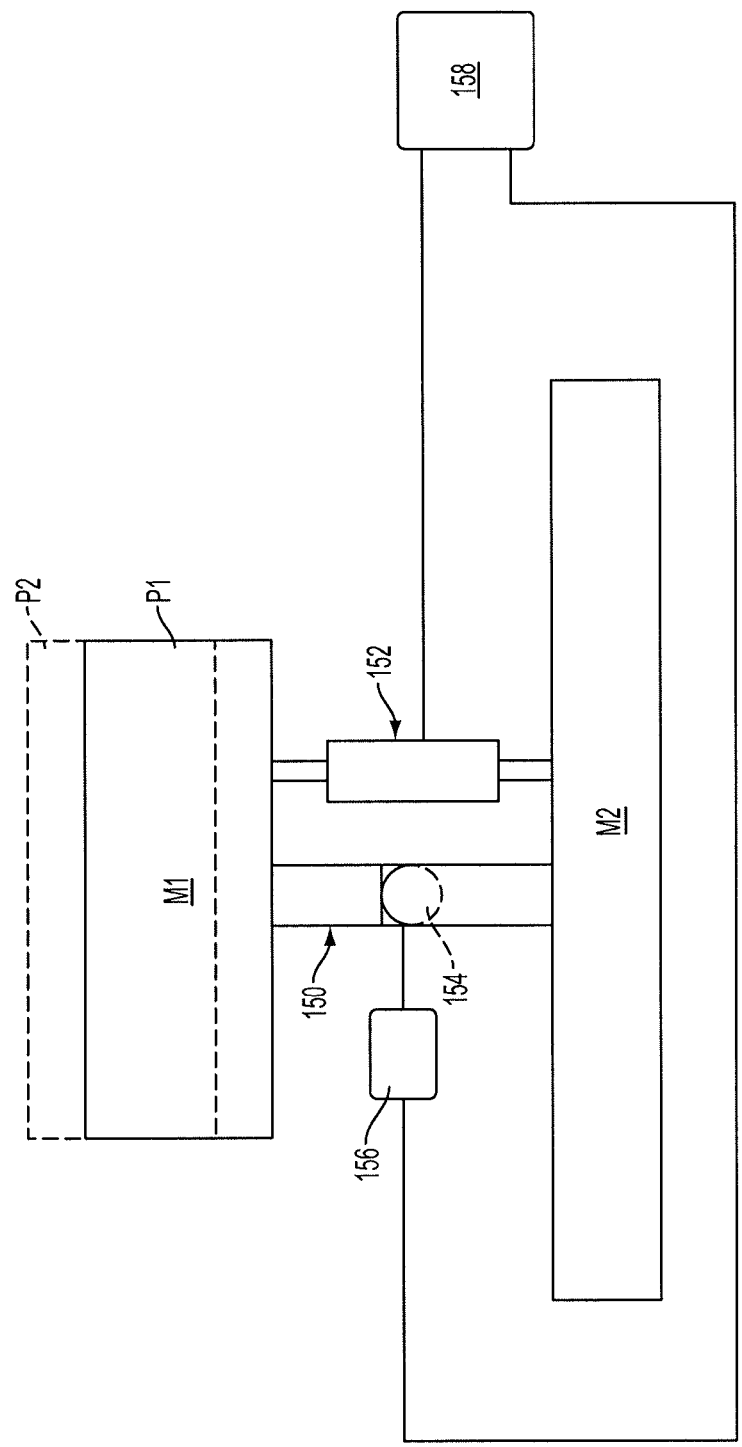
FIG. 2 is a schematic diagram of a holding device paired with a mover, wherein the holding device and mover are controllably operated so that the holding device holds the position of a mass displaced by the mover.

An exemplary arrangement is shown in FIG. 2, depicting a first mass M1 and a second mass M2 situated below the first mass. Between the first and second masses is a multi-blade holding device 150 and an actuator 152. The holding device 150 comprises an overlap region 154 that is selectively compressed and non-compressed using a compression device 156. The actuator 152 and compression device 156 are connected to and under operational control of a controller 158. To move the first mass M1 from the depicted first position P1 to a second position P2, the controller 158 commands the compression device 156 to decrease or remove compression of the overlap region 154, allowing the actuator 152 (as commanded by the controller 158) to cause movement of the first mass M1 to the new position P2. Upon the first mass M1 reaching the new position P2, the controller 158 commands the compression device 156 to re-apply compression to the overlap region 154 of the holding device while also commanding the actuator 152 to hold position or turn off. The holding device 150 can then continue to hold the first mass M1 at the position P2. To return the first mass M1 to the position P1, the controller 158 commands the compression device 156 to reduce compression applied at the overlap region 154, commands the actuator 152 to lower the first mass M1 to the position P1, and then commands the compression device 156 to re-apply compression at the overlap region 154. The actuator 152 can then be turned off or commanded to hold the first mass M1 at the position P1. Note that the actuators 152 are not limited to actuators that move the masses M1, M2 further apart. The actuators 152 can be, for example, bi- or multi-directional.

It will be understood from the foregoing that the holding device 150 can be incorporated and used in coordination with at least one actuator 152 and at least one compression device 156 for the holding device 150. Such a combination can be configured for efficiency, both spatially and control-wise. Spatial efficiency can be achieved by, for example, placing the holding device 150 inside the actuator 152 (an embodiment of such a configuration is described later below). Control efficiency is achieved by, for example, connecting the actuator 152 and compression device 156 to a controller 158 or the like that provides commands selectively to the actuator 152 and to the compression device 156 to produce a desired compression force to the overlap region 154 of the holding device 150.

Multiple holding devices 150 can be used to support all or a portion of a first mass relative to (e.g., above) a second mass. For such a purpose, a group of holding devices can be situated between the first mass and second mass and used in conjunction with one or more actuators used for changing (e.g., raising and lowering) the positions of respective portions of the first mass relative to the second mass. As the actuators change the positions of the respective portions of the first mass relative to the second mass, the overlap regions of the holding devices are either not compressed or minimally compressed. (A holding device in which the overlap region is compressed is referred to herein as a "clamped" device.) Before turning off the actuators after shifting the first mass, the holding devices are clamped so as collectively to hold the first mass at the new position relative to the second mass. In such an arrangement, each device can have associated with it a respective actuator, similar to what is shown in FIG. 2.

The holding devices need not all have the same orientation between the first and second masses. As a non-exclusive example, the devices can be arranged such that their compression axes are arrayed radially to accommodate thermal expansion and contraction of the first mass relative to the second mass in the radial directions. Alternatively, the devices can be arranged so that their respective "flexibility" axes are oriented along radial lines. (The flexibility axis is the axis (x or y) along which the holding device is relatively flexible rather than stiff.)

Compression of the blade-overlap region can be achieved by any of various manual means such as a bolt or threaded shaft, wherein tightening the bolt or a nut on the shaft against the overlap region increases compression of the overlap region. Desirably, a holding device can be used with a compression device that applies compression to, and removes compression from, the overlap region in a controlled manner (e.g., on command from an electronic controller). This controlled operation of the compression device can be coordinated with control operation of at least one actuator, as discussed above.

In the overlap region, clamped blades experience high inter-blade friction, resulting in the device being relatively stiff in the first orthogonal dimension (e.g., z-direction) due to axial (lengthwise) stiffness of the blades, relatively stiff in the second orthogonal dimension (e.g., x- or y-direction) due to lateral stiffness of the blades in their width dimensions, but relatively flexible in the third orthogonal dimension (e.g., remaining x- or y-direction) due to the flexibility of the blades in their thickness dimensions. Thus, a clamped holding device can hold a large mass.

Over at least a range, the greater the magnitude of compression applied to the overlap region, the greater the friction between blades in the overlap region, and the greater the corresponding resistance to displacement of the first portion relative to the second portion and/or of the second portion relative to the first portion.

Compression of the overlap region can be manual or automatic. Manual compression can be achieved using, for example, a manually actuated clamp (e.g., a "C" clamp). An example automatic compression device is an electrically actuated clamp or other compression-inducing component such as a solenoid. The automatic compression device can be "controlled" using, for example, an electronic controller to which the component is electrically connected and by which the component is actuated according to a software program, timing switches, or other suitable means. Controlled actuation can involve automatic timing and magnitude of compression, which can be of significant utility when automatic compression of multiple devices is coordinated with automatic operation of one or more actuators being used for moving a mass held by the devices.

In situations in which multiple devices are used to support a first mass relative to a second mass, the devices can be aligned such that their respective first dimensions are substantially parallel to each other even though the devices are placed at different locations between the masses. For example, multiple devices can be situated between first and second masses with all x-, y-, and z-directions being co-aligned. But, for some applications, such co-alignment is unnecessary. According to one non-exclusive example, the devices are placed between first and second masses so that the respective third dimensions of the devices are oriented radially. By orienting the flexible third dimensions of the devices in this manner, the devices collectively allow thermal expansion and contraction of the first mass relative to the second mass.

"Adjustability" of the devices in the support direction includes the ability of the devices to assume a selected first support position, to be released from the selected first support position, and to assume a selected second support position, and so on.

Figure 3:
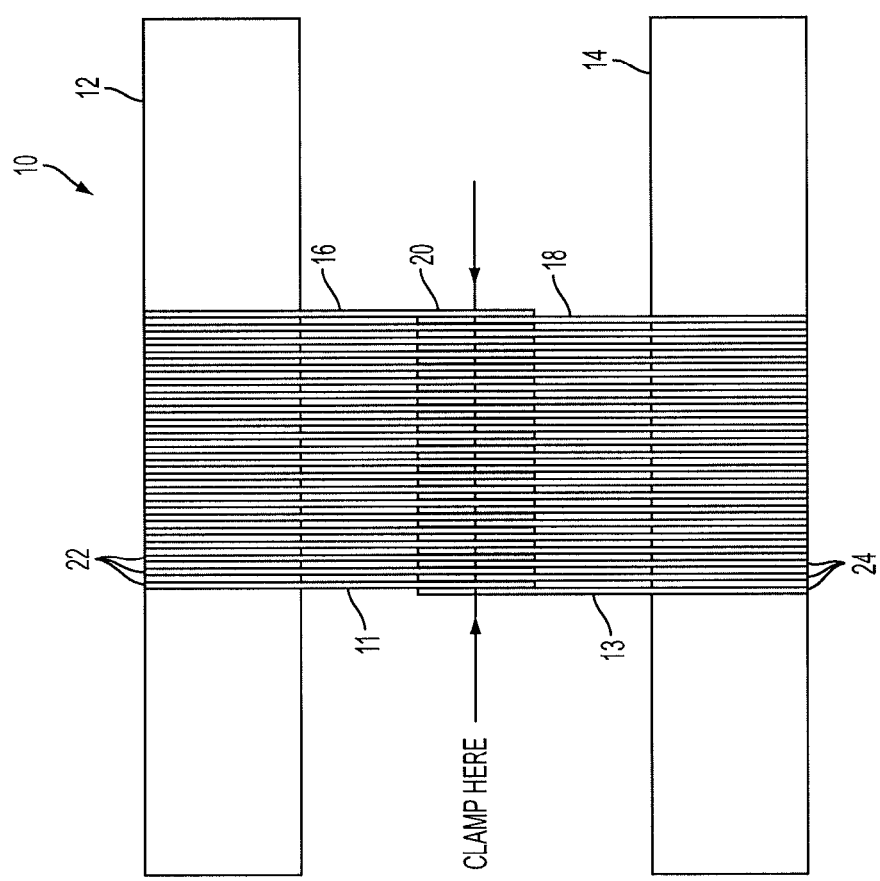
FIG. 3 is an elevational view of a second embodiment of a holding device.

A second representative embodiment of a holding device 10 is depicted in FIG. 3. The device 10 comprises a first portion 11 and a second portion 13. The first portion 11 is attached to a first mounting member 12, and the second portion 13 is attached to a second mounting member 14. The first portion comprises a respective set of multiple parallel blades 16, and the second portion comprises a respective set of multiple parallel blades 18. At a location between the first and second mounting members 12, 14, the blades 16, 18 are interleaved (interdigitated) with each other at a blade-overlap zone 20. In this embodiment the respective blades 16 of the first portion 11 are separated from each other by respective shims 22. Similarly, the respective blades 18 of the second portion 13 are separated from each other by respective shims 24. A compression ("clamping") force can be applied to the blade-overlap region 20. Whenever the clamping force is sufficiently reduced, the first portion 11 and/or second portion 13 can be shifted (e.g., pivoted) relative to the other. Compressing the blade-overlap region 20 prevents such motion. This shift can be in multiple directions in any range, so long as the blades in the overlap region 20 remain sufficiently overlapped for adequate compression.

The mounting members 12, 14 in this embodiment provide respective mountings for the blades of portions 11, 13. The mounting members 12, 14 also provide facilitate mounting of the device 10 to a mass.

The blades 16 each have a respective thickness that need not be equal to the thickness of the blades 18. The thickness of the shims 22 normally correlates with the thickness of the blades 18, and the thickness of the shims 24 normally correlates with the thickness of the blades 16. This thickness matching ensures that the blades 16, 18 can be interleaved without warping, and prevents unwanted contortion of the blade-overlap region 20. Lack of contortion is shown in FIG. 3 by the parallelism of the blades 16, 18 in this embodiment, including in the blade-overlap region 20. The thickness of the individual blades 16 need not be equal to the thickness of the individual blades 18. For example, if the blades in one set 16 are thinner than the blades in the other set 18, the shims 24 will normally be thinner than the shims 22, and vice versa. Alternatively, the shims 24 can be made slightly thicker than the thickness of the blades 18 and 16 to create a clearance between the blades 18 and 16 whenever the blades are unclamped, thereby to reduce the friction between the interleaved blades when they are unclamped.

In the blade-overlap region 20, the blades 16, 18 are interdigitated (interleaved) with each other. The vertical dimension of the blade-overlap region 20 is a function of the degree of overlap of the blades 16, 18 in the region 20. Increasing the vertical dimension of the blade-overlap region 20 can be performed by displacing the first portion 11 downward relative to the second portion 13 or by displacing the second portion 13 upward relative to the portion first portion 11. Similarly, decreasing the vertical dimension of the blade-overlap region 20 can be performed by displacing the first portion 11 upward relative to the second portion 13 or by displacing the second portion 13 downward relative to the first portion 11.

Since each blade is relatively thin, the ratio of blade thickness to blade length can be small; hence, whenever the device is being used to hold a mass, the stress on each blade can be reduced to below its yield stress. Also, since each blade is relatively thin, it has relatively small radial stiffness compared to its z-directional and tangential stiffnesses. By employing multiple blades, their stiffnesses in the z-direction are additive, yielding a high collective z-stiffness.

Figure 4A:
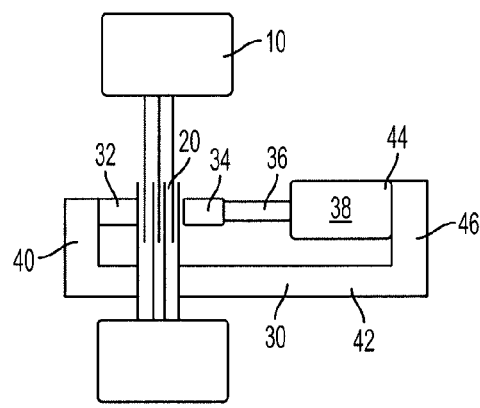
FIG. 4A is a schematic diagram of an embodiment of a holding device comprising a C-type clamp used to apply compression to the overlap region.

Clamping the blade-overlap region 20 can be performed using any of various clamping devices, such as, but not limited to, pneumatic clamps, hydraulic clamps, mechanical clamps, electromechanical clamps, and piezoelectric clamps. These clamping devices can be connected so as to operate automatically or by command, or operate manually. Referring to FIG. 4A, the device 10 is shown in which a "C" clamp 30 is used for clamping the blades at the overlap region 20. The "C" clamp 30 includes a first seat 32 situated on one side of the overlap region 20, and a second seat 34 located on the other side of the overlap region. The second seat 34 is mounted to the terminus of an actuator rod 36 that his driven using an actuator 38. The first seat 32 is mounted to one arm 40 of a C-shaped member 42, and the proximal end 44 of the actuator 38 is mounted to the other arm 46 of the C-shaped member 42. The actuator 38 can be a pneumatic, hydraulic, mechanical (e.g., screw-drive), electromechanical, or piezoelectric actuator, for example. The actuator can be configured to close the clamping device when the actuator is energized, or configured with a spring-load so that the actuator 38 opens the clamping device when the actuator is energized, and the clamping device remains closed when the actuator is not being energized. The latter configuration is desirable in certain situations in which the clamping device(s) are to remain closed in the event of an unintentional power failure or failure in supplied pressure.

Figure 4B:
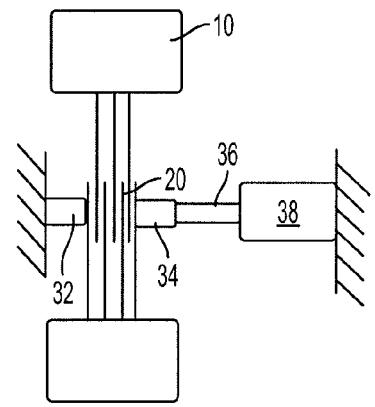
FIG. 4B is a schematic diagram of an embodiment of a holding device comprising a clamp with fixed seat and opposing actuator.
Figure 4C:
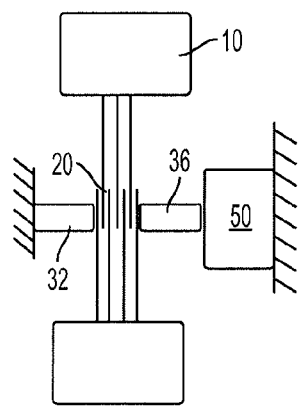
FIG. 4C is a schematic diagram of an embodiment of a holding device comprising a piezoelectric or analogous clamp.
Figure 4D:
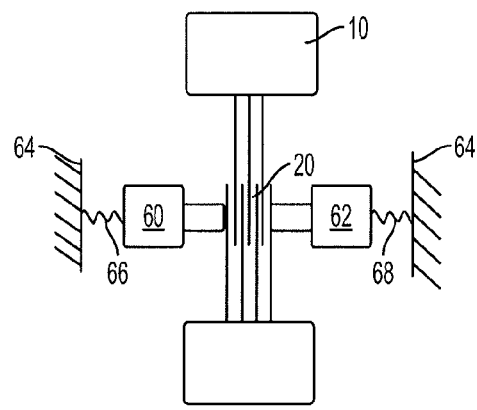
FIG. 4D is a schematic diagram of an embodiment of a holding device comprising a floating clamp.

In an alternative configuration as shown in FIG. 4B, the C-clamp 30 is replaced with simply the first seat 32, second seat 34, actuator rod 36, and actuator 38. In another alternative configuration, as shown in FIG. 4C, a piezoelectric actuator 50 is used, in cooperation with the first and second seats 32, 36. In yet another alternative configuration, as shown in FIG. 4D, the blade-overlap region 20 is flanked by a first actuator 60 and a second actuator 62. The actuators 60, 62 are mounted to a base structure 64 by respective compliant members 66, 68, which effectively places the actuators in a floating condition relative to the base structure 64. Floating actuators help ensure that the respective clamping forces applied thereby to the overlap region 20 are substantially balanced.

Figure 5B:
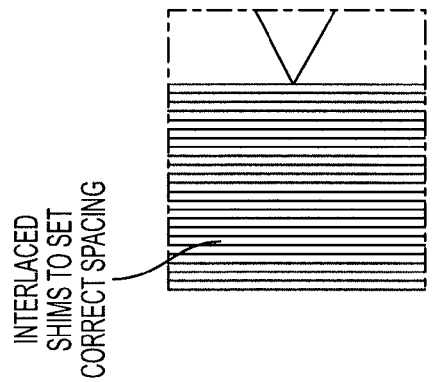
FIG. 5 is an oblique view of the holding device shown in FIG. 3.
Figure 5A:
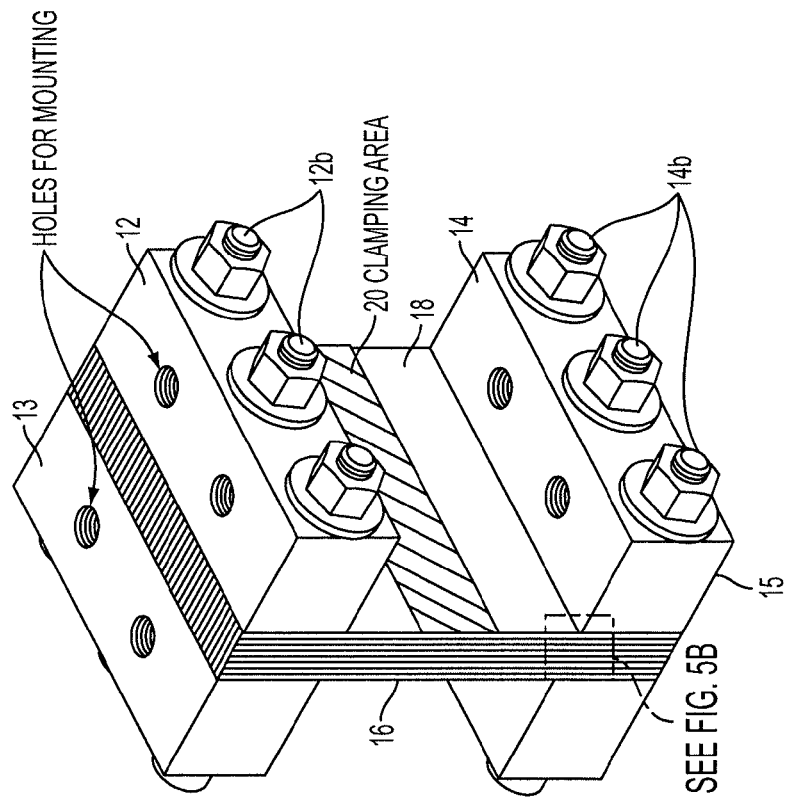

The first and second mounting members 12, 14 are each attachable to a respective mass. Referring now to FIG. 5, the first and second mounting members 12, 14 can be mountable to their respective masses (not shown) by bolts 12b, 14b extending vertically through the mounting members via the "holes for mounting." It will be understood, however, that use of bolts for this purpose is exemplary only, and any of various other attachment schemes can be used to anchor the mounting members to their corresponding masses.

If desired or required, the upper surface 13 of the mounting member 12 and/or the lower surface 15 of the mounting member 14 can be machined to establish, for example, a desired degree of flatness or other surface profile.

Figure 6:
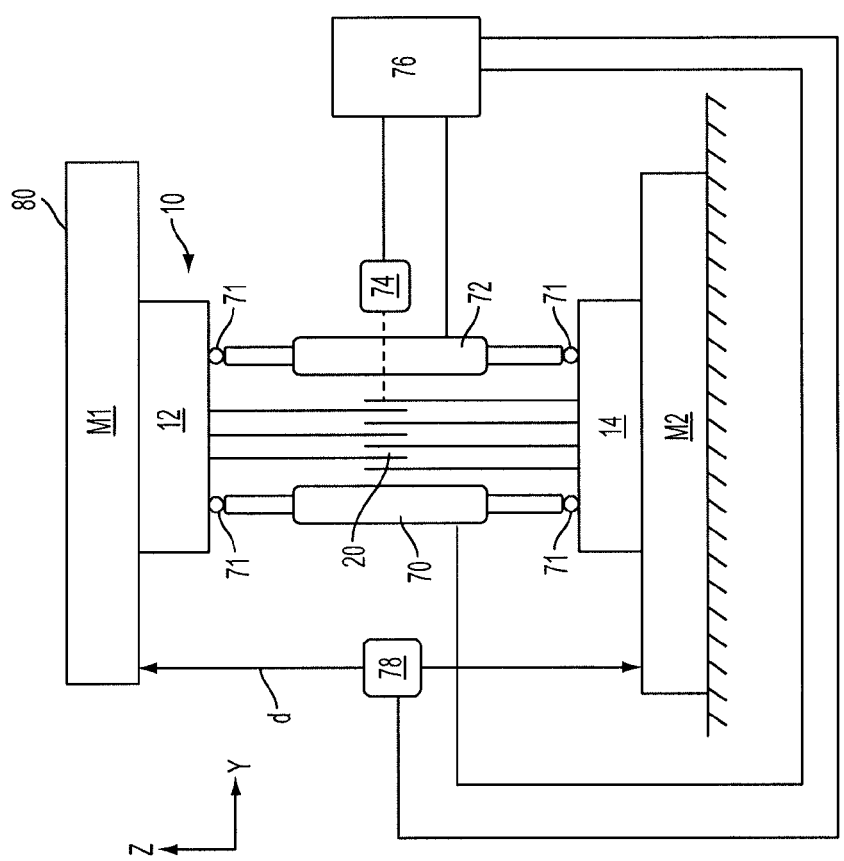
FIG. 6 is a schematic diagram of an embodiment of a structure comprising movers (anti-gravity devices) as well as a holding device, wherein the movers and holding device are connected to operate cooperatively.

In some applications, the device 10 need not actually support the masses to which it is mounted. FIG. 6, for example, depicts a configuration in which a device 10 is placed between two masses M1, M2. The mounting member 12 is affixed to the first mass M1, and the mounting member 14 is affixed to the second mass M2. In this configuration, at least the first mass M1 and first mounting member 12 are supported, at least in part, relative to gravity "g" by actuators or movers 70, 72 placed between the mounting members 12, 14. Whenever the overlap zone 20 is unclamped by deactivation of a clamping device 74, the actuators 70, 72 prevent the device 10 from collapsing vertically downward. Particularly if the mounting members 12, 14 are affixed to the first and second masses M1, M2, respectively, it will be understood that the actuators 70, 72 can be placed so as to extend between the first and second masses M1, M2 rather than between the mounting members 12, 14.

The embodiment shown in FIG. 6 is also an example of a substantially automated system, wherein the device 10 is unclamped by deactivation of the clamping device 74 accompanied by activation of the actuators 70, 72, and the device 10 is clamped by activation of the clamping device 74 accompanied by deactivation of the actuators 70, 72. These actions can be coordinated and controlled by a processor 76 that receives distance data from a distance-measuring device (e.g., interferometer) 78. Thus, for example, the flatness parameter of the upper surface of the mass M1 can be automatically monitored and maintained. For example, the distance d can be measured and corrected periodically.

Further with respect to FIG. 6, the connections of the actuators 70, 72 to the mounting members 12, 14 or to the masses M1, M2 can include flexures 71 or the like to prevent the actuators 70, 72 from over-constraining displacement of the mass M1 relative to the mass M2.

Figure 7:
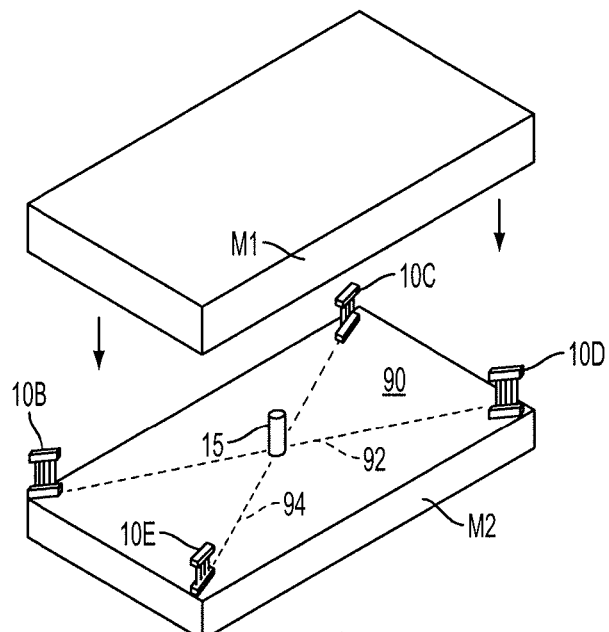
FIG. 7 is a schematic diagram of an embodiment of a structure comprising, for example, four holding devices arranged to provide reduced constraint in radial directions, relative to a fixed, rigid central support.

Key advantages of the devices 10 include their high stiffness in the z-direction and in an orthogonal direction, and compliance in the other orthogonal direction. For example, referring to FIG. 5, the device 10 exhibits high stiffness in the z- and x-directions and relatively low stiffness (i.e., is relatively flexible) in the y-direction. Consequently, the devices 10 can be used in combinations providing a kinematic mounting of a first mass M1 relative to a second mass M2. An example is shown in FIG. 7A, in which first and second masses M1, M2 are depicted vertically separated from each other. Mounted to the upper surface 90 of the second mass M2 are four devices 10A-10D and a centrally located rigid support 15. A respective device 10A-10D is mounted in each corner of the surface 90. Drawn on the surface 90 are diagonal lines 92, 94 (dashed lines) that pass through the locus at which the rigid support 15 is mounted and pass through the loci at which the respective corner devices 10A, 10C, and 10B, 10D are mounted. The corner devices 10A-10D are mounted such that their respective flexibility directions are aligned with the respective diagonal line 92, 94. The rigid support 15 can be replaced, if desired in an alternative embodiment, with a holding device according to any of the embodiments disclosed herein, with any of various orientations with respect to its flexibility direction. The configuration shown in FIG. 7 is particularly advantageous for, in addition to holding the first mass M1, accommodating thermal expansion of the mass M1 relative to the mass M2 in radial directions from the center of the mass M2. I.e., the respective flexibilities of the devices 10A-10D accommodate corresponding radial expansion or contraction of the mass M1 relative to the location of the central support 15. The respective flexibilities of the devices 10A-10D also eliminate the consequences of lack of parallelism between the first and second masses that otherwise could cause, for example, the first mass M1 to warp relative to the second mass M2 if the two masses were rigidly coupled together.

Figure 8:
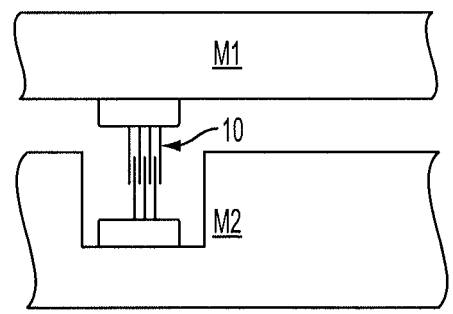
FIG. 8 is a schematic diagram of a holding device situated in a recess in a lower mass, while holding an upper mass relative to the lower mass.

Not intending to be limiting in any way, a representative length of any of the devices 10A-10D in FIG. 7 is approximately 100 mm. To avoid having to impose the same distance between the masses M1 and M2 as the length of the devices, the devices can be mounted in respective recesses in the upper surface 90 of the second mass M2, as shown in FIG. 8.

Another key advantage is that the devices 10 are readily clamped and unclamped at positions dictated by surrounding structure. When unclamped, the devices 10 readily accommodate changes in position of the masses M1, M2 relative to each other. When clamped, the devices 10 maintain their positions and orientations, even after prolonged use.

In a device 10, the number of blades is not limited. As few as three blades can provide blade interdigitation, so a preferred number is at least three blades. It is possible to have as few as two blades, but such a configuration is not recommended. There is no established maximum number of blades.

The blades can be made of any suitable rigid material, including any of various metals but also including any of various other rigid materials such as polymers, ceramics, fiberglass, and the like. The blades can be coated or noncoated as conditions dictate. For example, the portion of the blades situated in the blade-overlap region can be coated with a friction-reducing substance to make it easier to adjust an unclamped device. As mentioned above, the total magnitude of friction in the overlap region can be quite large, and there may be situations in which it is desirable to reduce the friction without reducing the number or geometry of the blades.

Figure 9B:
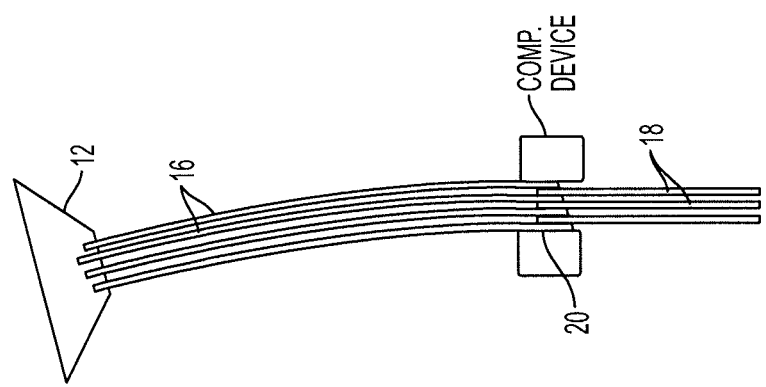
FIGS. 9A and 9B are respective orthogonal views of an embodiment of a holding device having relatively long but wide blades.
Figure 9A:
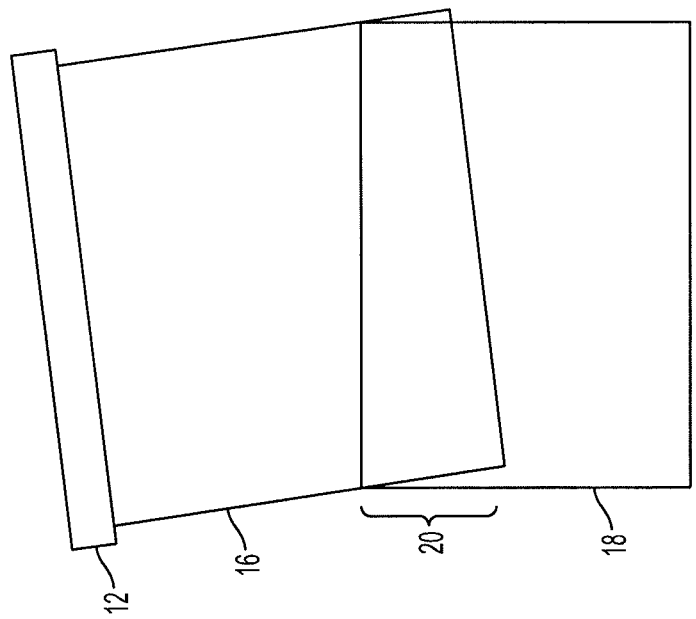
Figure 10:
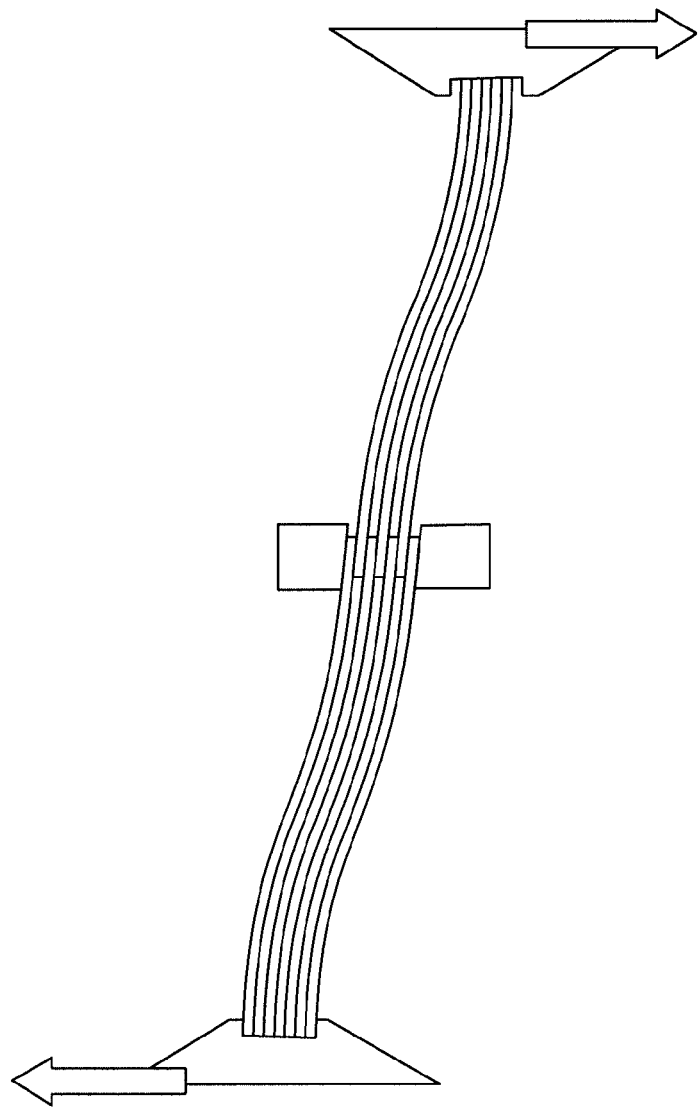
FIG. 10 is an elevational view of an embodiment of a holding device having thin, flexible blades.

Another important advantage of a device 10 as disclosed herein is that, when the blades are not clamped, they can slip relative to each other to accommodate any tip and/or tilt angle between the two mounting members. This is shown in FIGS. 9A and 9B. Turning to FIG. 10, it can be seen that parallel, thin, flexible blades provide low stiffness in one horizontal direction. This allows relative motion between the masses in this direction. This can be used for example to accommodate differential thermal expansion occurring in one mass relative to the other mass.

In a device 10, the blades 16 attached to the first mounting member 12 need not have the same length as the blades 18 attached to the second mounting member 14. Also, the blades 16 attached to the first mounting member 12 need not have the same thickness as the blades 18 attached to the second mounting member 14. The blade thickness will, however, impact the thickness of the shims 22, 24.

The shims 22, 24 need not have exactly the same thickness as the corresponding blades. For example, it may be advantageous for the shims to be slightly thicker than the corresponding blades so as to avoid excess friction in the overlap region 20.

Figure 11:
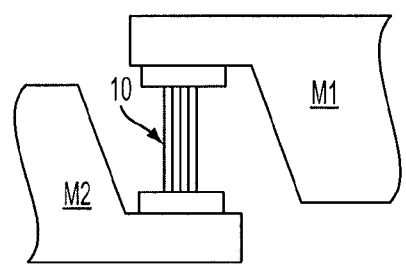
FIG. 11 is a schematic diagram of a holding device in a situation in which the device is in tension rather than compression.

The devices 10, as evident from the discussion above, can be used in situations in which they are bearing at least a portion of a load. Alternatively, the devices can be used under tension. An example is shown in FIG. 11, in which the first mass M1 is stationary and a second mass M2 is displaceable relative to the first mass. I.e., gravity is pulling on the second mass but not on the first mass.

There is no limit to the size, either larger or small, of the devices. They can be scaled up or down and size to accommodate substantially any situation.

A summary of advantages of devices as disclosed herein is as follows:

(a) The devices are easily adjustable in up to four degrees of freedom (DOF) and movable in an additional two DOF when unclamped.

(b) The devices exhibit high sliding friction when clamped with a relatively low clamping force.

(c) The devices exhibit little to no positional or angle shift during clamping.

(d) Multiple parallel flexure blades provide high stiffness in the vertical and one orthogonal (horizontal) directions for good constraint between the joined masses.

(e) Stiffness is low in the other horizontal direction to allow, for example, differential thermal expansion between the masses without over-constraint.

EXAMPLE

This example pertains to a device having the following configurational parameters:
Blades: 20
Blade Thickness: 0.25 mm
Blade Length: 15 mm
Blade Width: 60 mm
Obtained data: $k_z = 1.9 \times 10^9$ N/m
$k_{radial} = 5.3 \times 10^5$ N/m
$k_{tangent} = 6.7 \times 10^8$ N/m
$\sigma_{max} = 31.6$ MPa where:

$$k_z = n \frac{Ebh}{L}$$

and $\sigma_{max} = \frac{Eh}{2L} \Delta \theta$

Referring again to FIG. 6, the first mass M1 is moved relative to the second mass M2 by actuators 70, 72. In FIG. 6 the actuators 70, 72 apply an anti-gravity force in a bilaterally symmetrical manner relative to the device 10 so as to move the first mass M1 relative to the second mass M2. In another embodiment, the device 10 can be situated inside an actuator or be surrounded by an actuator device.

For example, certain applications require that the actuator be compact, pneumatic in actuation, and able to apply a high, bi-directional force at relatively low pressure over a small displacement range. For example, supporting and adjusting the flatness of a large plate may require that the actuator be capable of exerting at least 1000 N using less than 400 kPa of pneumatic pressure. For this purpose an actuator comprising parallel stacked pneumatic rings can be used to provide selective up and down motion. An advantage of the stacked-ring actuator is its ability to accommodate the device 10 situated coaxially with or even placed inside the actuator.

Figure 12:
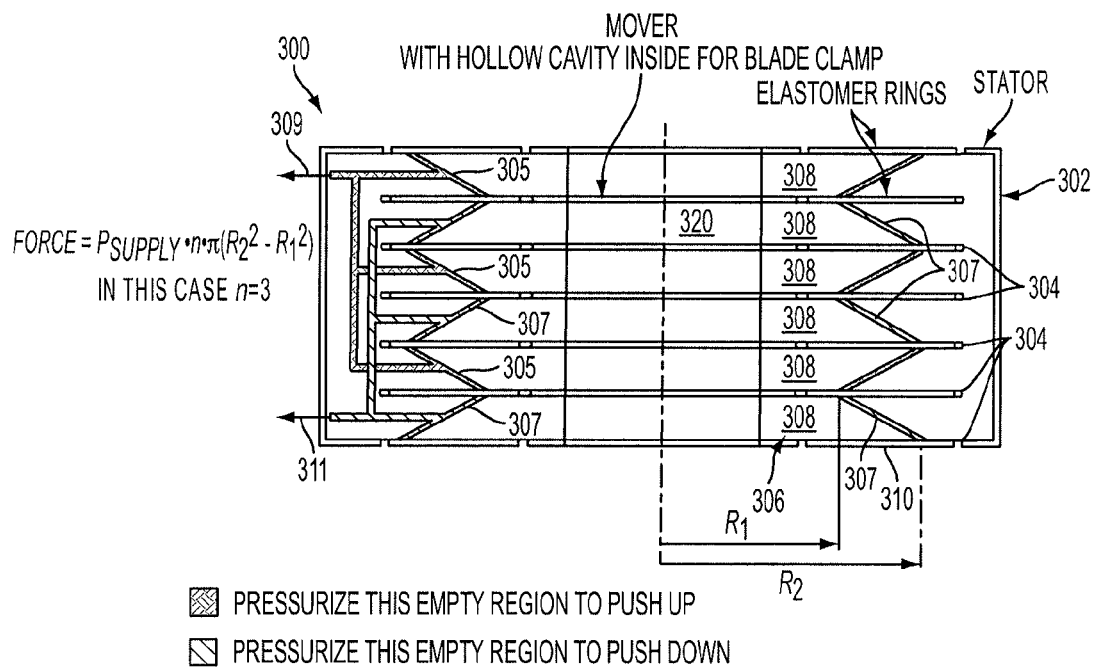
FIG. 12 is an elevational section of an embodiment of a stacked-ring pneumatic actuator usable in coordination with a holding device.
Figure 13:
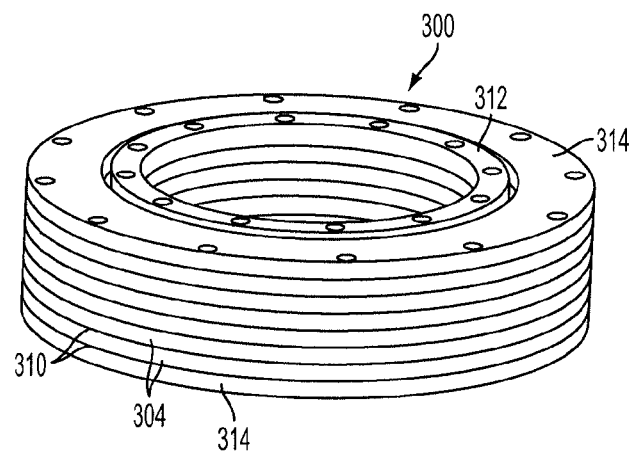
FIG. 13 is a perspective view of the actuator of FIG. 12.
Figure 14:
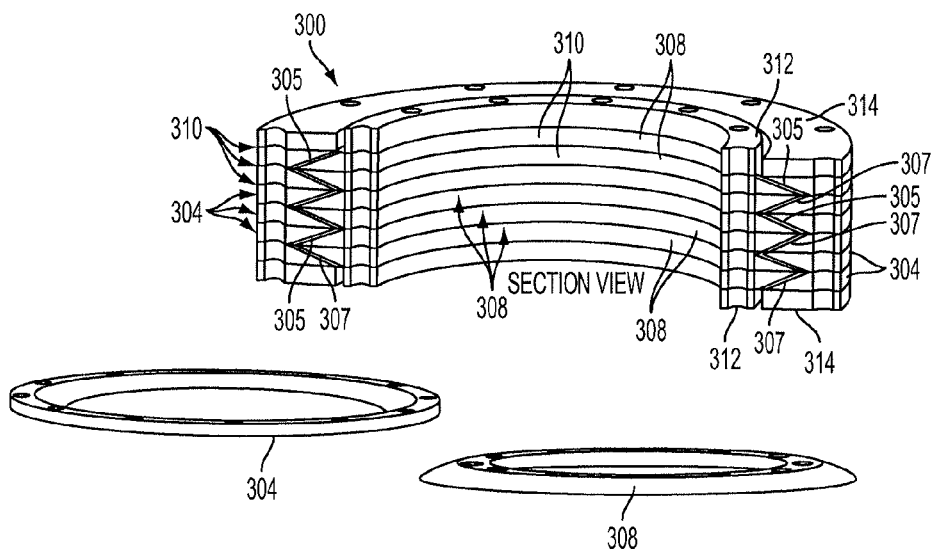
FIG. 14 is a perspective sectional view of the actuator of FIG. 12, showing details of inner and outer rings.
Figure 15:
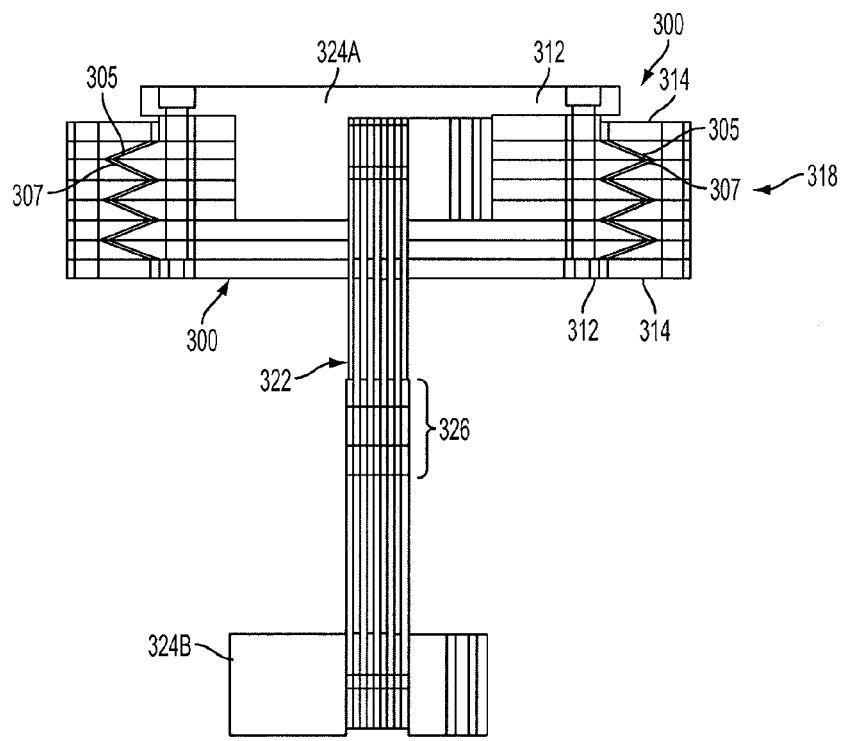
FIG. 15 is an elevational view of an assembly comprising a stacked-ring actuator and a holding device.

An embodiment of a stacked-ring pneumatic actuator 300 is shown in FIGS. 12-15. The actuator 300 comprises a "stator" 302 comprising a stack of outer air-rings 304 and a "mover" 306 comprising a corresponding stack of inner air-rings 308. The stacks of air-rings are coaxial. Each outer air-ring 304 has a tapered inner edge, and each inner air-ring 308 has a correspondingly tapered outer edge. Note the diameters $R_1$ and $R_2$. Each inner air-ring 308 is paired with a corresponding outer air-ring 304 having a complementary tapered edge. Thus, each pair consists of a respective inner air-ring and respective outer air-ring. Between each pair of air-rings in the axial direction is a respective elastomeric, annular seal 310. The seal 310 has sufficient radial width to extend outward to between the corresponding outer air-rings. The annular seal 310 creates a respective axial space between the tapered edges of each pair of inner and outer air-rings. The axial spaces 305 located between the upward-facing tapered edges of the outer air-rings 304 and corresponding downward-facing tapered edges of the inner air-rings 308 are commonly connected, via respective conduits in the outer air-rings, to a source of high pneumatic pressure 309 to produce, when pressurized in a controlled manner, an upward force to the mover 306 relative to the stator 302. Similarly, the axial spaces 307 located between the downward-facing tapered edges of the outer air-rings 304 and corresponding upward-facing tapered edges of the inner air-rings 308 are commonly connected, via respective conduits in the outer air-rings, to the source of high pneumatic pressure 311 to produce, when pressurized in a controlled manner, a downward force to the mover 306 relative to the stator 302. If P is the source pressure, the force produced by the mover relative to the stator is:

$$F = (P_{source}) \cdot n \cdot \pi \cdot (R_2^2 - R_1^2)$$

where n is the number of "up" axial spaces and "down" axial spaces (here, n=3). Outside detail of the actuator 300 is shown in FIG. 13. Not shown in FIG. 12 are inner and outer axial end caps, but details of the inner and outer end caps 312, 314 are shown in FIGS. 13 and 14.

This particular actuator 300 has an inner chamber 320 that is especially useful for accommodating a corresponding multi-blade device, thereby providing a combination device 318 comprising the actuator 300 and a respective multi-blade holding device 322 mounted thereto. The multi-blade holding device 322 includes mounting members 324A, 324B by which the device 322 is mounted to a first mass and a second mass (not shown, but see FIG. 9 for example). The multi-blade holding device 322 includes a compression region 326. The combination device 318 is operable in a manner as generally shown in FIG. 2 and described above.

Figure 16:
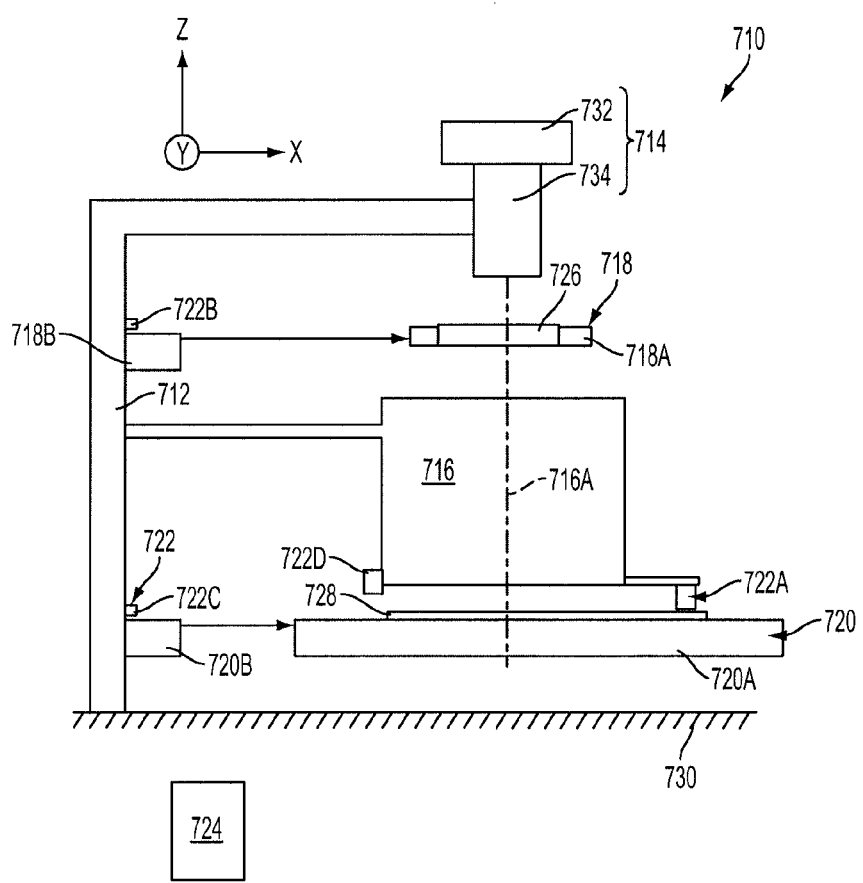
FIG. 16 is a schematic depiction of a microlithography system, as an exemplary precision system, comprising a stage assembly as disclosed herein that includes at least one holding device.

Included in this disclosure are any of various precision systems comprising a stage or the like that holds a workpiece or other item useful in a manufacture. An example of a precision system is a microlithography system or exposure "tool" used for manufacturing semiconductor devices. A schematic depiction of an exemplary microlithography system 710, comprising features of the invention described herein, is provided in FIG. 16. The system 710 includes a system frame 712, an illumination system 714, an imaging-optical system 716, a reticle-stage assembly 718, a substrate-stage assembly 720, a positioning system 722, and a system-controller 724. The configuration of the components of the system 710 is particularly useful for transferring a pattern (not shown) of an integrated circuit from a reticle 726 onto a semiconductor wafer 728. The system 710 mounts to a mounting base 730, e.g., the ground, a base, or floor or other supporting structure. The system also includes a measurement system 722a that measures the position of a lithographic substrate (as an exemplary workpiece) along an axis (e.g., the z-axis or optical axis) with improved accuracy and precision. In the system 710, the reticle-stage assembly and/or the substrate-stage assembly 720 include a multi-blade holding device as described in the above representative embodiments.

Figure 17:
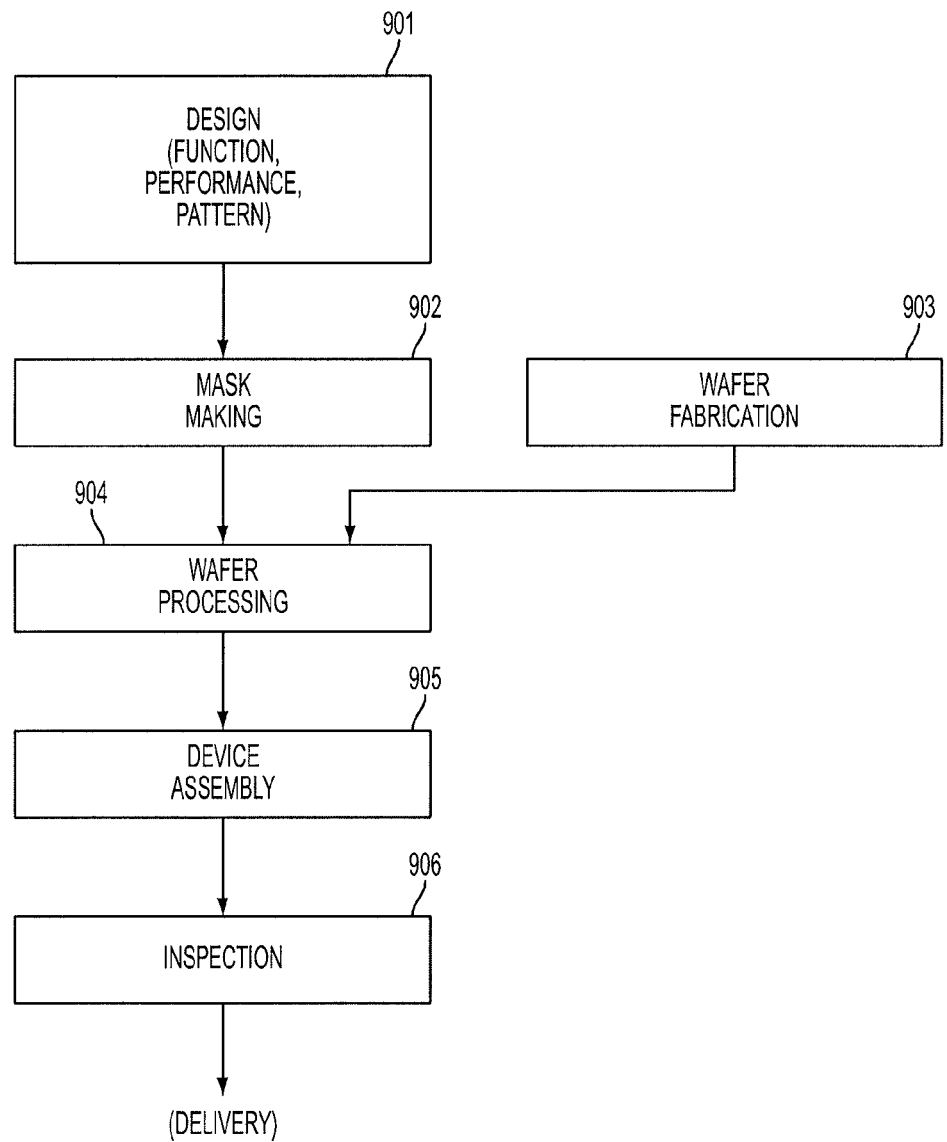
FIG. 17 is a flowchart of an exemplary process for manufacturing semiconductor devices, including an exposure step.

An exemplary process for manufacturing semiconductor devices, including an exposure step, is shown in FIG. 17. In step 901 the device's function and performance characteristics are designed. Next, in step 902, a mask (reticle) having a desired pattern is designed according to the previous designing step, and in a parallel step 903 a wafer is made from a suitable semiconductor material. The mask pattern designed in step 902 is exposed onto the wafer from step 903 in step 904 by a microlithography system described herein in accordance with the present invention. In step 905 the semiconductor device is assembled (including the dicing process, bonding process, and packaging process. Finally, the device is inspected in step 906.

Figure 18:
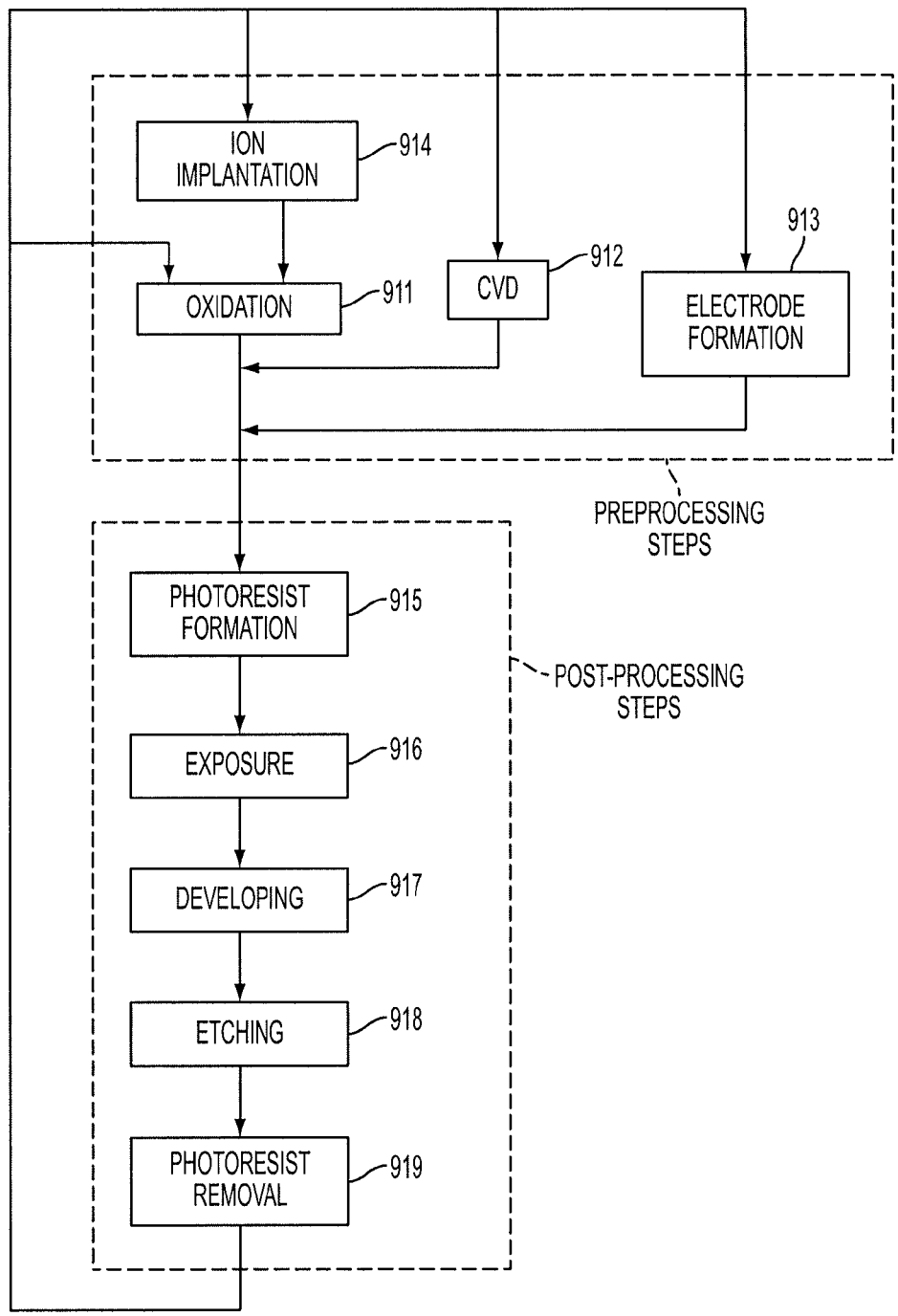
FIG. 18 is a flowchart of step 904 in FIG. 17, applicable to the case of fabricating semiconductor devices.

FIG. 18 is a flowchart of the above-mentioned step 904 in the case of fabricating semiconductor devices. In FIG. 18, in step 911 (oxidation step), the wafer surface is oxidized. In step 912 (CVD step), an insulation film is formed on the wafer surface. In step 913 (electrode-formation step), electrodes are formed on the wafer by vapor deposition. In step 914 (ion-implantation step), ions are implanted in the wafer. The above-mentioned steps 911-914 constitute the preprocessing steps for wafers during wafer processing, and selection is made at each step according to processing requirements.

At each stage of wafer-processing, when the above-mentioned preprocessing steps have been completed, the following "post-processing" steps are implemented. During post-processing, first, in step 915 (photoresist-formation step), photoresist is applied to a wafer. Next, in step 916 (exposure step), the above-mentioned exposure device is used to transfer the circuit pattern of a mask (reticle) to a wafer. Then, in step 917 (developing step), the exposed wafer is developed, and in step 918 (etching step), parts other than residual photoresist (exposed material surface) are removed by etching. In step 919 (photoresist-removal step), unnecessary photoresist remaining after etching is removed. Multiple circuit patterns are formed by repetition of these pre-processing and post-processing steps.

Whereas the invention has been described in connection with representative embodiments, it will be understood that it is not limited to those embodiments. On the contrary, it is intended to encompass all alternatives, modifications, and equivalents as may be included within the spirit and scope of the invention as defined by the appended claims.

What is claimed is:

1. A device, comprising first and second portions movably connected together by first and second sets, respectively, of multiple blades interleaved with each other at an overlap region that, when compressed, inhibits displacement of the first and second sets relative to each other to provide a first stiffness in first and second orthogonal directions and a second stiffness in a third orthogonal direction, wherein the first stiffness is greater than the second stiffness.

2. The device of claim 1, wherein the blades are parallel to each other at least in the overlap region.

3. The device of claim 1, further comprising a compressive-force component situated relative to the overlap region and operable selectively to increase a compressive force applied to the overlap region and to reduce the compressive force applied to the overlap region.

4. The device of claim 3, further comprising an actuator configured to produce a displacement force to an object in coordination with operation of the compressive-force component.

5. The device of claim 1, further comprising an actuator producing a displacement force to an object being held by the device.

6. The device of claim 5, wherein application of the displacement force by the displacement actuator is coordinated with reducing compression of the overlap region.

7. The device of claim 5, wherein the displacement actuator is symmetrically situated relative to the device.

8. The device of claim 5, wherein the actuator is configured to urge movement of the object when the overlap region is not being compressed, and not to urge movement of the object when the overlap region is being compressed.

9. The device of claim 1, wherein each blade in the first and second sets has a length, a thickness, and a width, the width being greater than the thickness to provide stiffness in a first direction substantially parallel to the length and in a second direction normal to the first direction and flexibility in a third direction orthogonal to the first and second directions.

10. The device of claim 1, wherein:
the blades in the first set are separate from each other by respective shims; and
the blades in the second set are separate from each other by respective shims.

11. The device of claim 1, further comprising a compression-applying actuator that, in response to a clamp command, compresses the overlap region and that, in response to a clamp-release command, reduces or removes compression being applied to the overlap region.

12. A device, comprising:
a holding device for placement between a first mass and a second mass, the holding device comprising first and second portions movably connected together by first and second sets, respectively, of multiple blades interleaved with each other at an overlap region that, when compressed, inhibits displacement of the first and second sets relative to each other;
a compression device operable to apply a compression force to the overlap region; and an actuator connected to one of the first and second masses, the actuator being operable to apply a displacement force urging movement of at least one of the first and second masses relative to the other mass.

13. The device of claim 12, wherein:
the holding device with a compressed overlap region exhibits a first stiffness in first and second orthogonal directions and a second stiffness in a third orthogonal direction; and
the first stiffness is greater than the second stiffness.

14. The device of claim 12, further comprising a controller connected to the holding device, to the compression device, and to the actuator, the controller being configured to command the actuator to urge movement of at least one of the masses when the compression device is applying a reduced compression force to the overlap region and to command the actuator not to urge movement of the at least one of the masses when the compression device is applying an increased compression force to the overlap region.

15. The device of claim 12, wherein the actuator comprises a stacked-ring pneumatic actuator.

16. An assembly, comprising:
a first mass that is movable relative to a second mass; and
at least one coupling extending between the first and second masses;
each coupling comprising a respective holding device comprising first and second portions coupled to the first and second masses, respectively, the first and second portions being movably connected together by first and second sets, respectively, of multiple blades interleaved with each other at an overlap region that, when compressed, inhibits displacement of the first and second sets relative to each other to provide respective support of a respective portion of the first mass having a first stiffness in first and second orthogonal directions and a second stiffness in a third orthogonal direction, wherein the first stiffness is greater than the second stiffness.

17. The assembly of claim 16, wherein the coupling further comprises a compression device configured to apply at selected times a force to the overlap region to compress the overlap region.

18. The assembly of claim 16, further comprising at least one actuator configured to cause movement at selected times of the first mass relative to the second mass.

19. The assembly of claim 16, further comprising:
at least one actuator configured to cause movement at selected times of the first mass relative to the second mass; and
a compression device configured to apply a force to the overlap region to compress the overlap region at selected times when the actuator is not causing movement of the first mass.

20. The assembly of claim 19, further comprising a controller connected to the actuator and compression device to control movement of the first mass and application of force to the overlap region, such that a first force is applied whenever the actuator is causing movement and a second force is applied whenever the actuator is not causing movement, wherein the second force is greater than the first force.

21. A stage assembly, comprising:
a base;
a table that is displaceable relative to the base;
at least one coupling extending between the table and base; and
at least one coupling comprising a respective holding device comprising first and second portions coupled to the table and base, respectively, the first and second portions being movably connected together by first and second sets, respectively, of multiple blades interleaved with each other at an overlap region that, when compressed, inhibits displacement of the first and second sets relative to each other to provide respective support of a respective portion of the table, the support having a first stiffness in first and second orthogonal directions and a second stiffness in a third orthogonal direction, wherein the first stiffness is greater than the second stiffness.

22. The stage assembly of claim 21, wherein each coupling further comprises a compression device configured to apply at selected times a force to the overlap region to compress the overlap region.

23. The stage assembly of claim 21, further comprising at least one actuator configured to cause movement at selected times of the table relative to the base.

24. The stage assembly of claim 21, further comprising:
at least one actuator configured to cause movement at selected times of the table relative to the base; and
a compression device configured to apply a force to the overlap region to compress the overlap region at selected times when the actuator is not causing movement of the table.

25. The assembly of claim 24, further comprising a controller connected to the actuator and compression device to control movement of the table and application of force to the overlap region, such that relatively lesser force is applied whenever the actuator is causing movement and relatively greater force is applied whenever the actuator is not causing movement.

26. The assembly of claim 21, further comprising multiple couplings extending between and holding respective portions of the table relative to the base, each coupling comprising a respective holding device oriented so that the holding device has a respective orientation by which the third orthogonal directions of the holding devices are arranged to relieve thermal expansion of the table relative to the base.

27. The assembly of claim 26, wherein the orientations are radial.

28. A precision system, comprising a stage assembly as recited in claim 21.

29. A microlithography system, comprising a stage assembly as recited in claim 21.

30. An assembly, comprising:
a first mass;
a second mass; and
at least one holding device mounted to the first and second masses and extending between the first and second masses, the holding device comprising a first set of multiple blades, a second set of multiple parallel blades interleaved with the first set of blades at an overlap region, and a compression device, situated at the overlap region and configured to apply, in a selectable manner, a clamping force to the overlap region, the first set of blades being mounted to the first mass, and the second set of blades being mounted to the second mass.

31. The assembly of claim 30, further comprising an actuator that, in response to a clamp command, applies the clamping force to the overlap region and that, in response to a clamp-release command, reduces or removes the clamping force to the overlap region.

32. The assembly of claim 31, wherein:
each blade in the first and second sets has a length, a thickness, and a width, the width being greater than the thickness to provide the holding device with a first direction substantially parallel to the length and in a second direction normal to the first direction. and also to provide flexibility in a third direction orthogonal to the first and second directions; and the actuator applies the clamping force in a direction substantially parallel to the third direction.

33. The assembly of claim 31, further comprising a plurality of support devices extending between the first and second masses, each support device supporting a respective portion of the first mass relative to the second mass.

34. The assembly of claim 33, wherein:

each blade in the first and second sets has a length, a thickness, and a width, the width being greater than the thickness to provide stiffness in a first direction substantially parallel to the length and in a second direction normal to the first direction and flexibility in a third direction orthogonal to the first and second directions;

the first mass has an expansion direction relative to the second mass; and at least one of the support devices is arranged such that its respective third direction is parallel to the expansion direction.

35. The assembly of claim 31, wherein:

the first mass has multiple directions of thermal expansion; and the support devices are mounted between the first and second masses such that, along each of multiple directions of thermal expansion is at least one holding device arranged such that its respective third direction is parallel to the respective direction of thermal expansion.

36. The assembly of claim 35, wherein the directions of thermal expansion are radial.

37. A microlithography system, comprising an assembly as recited in claim 30.

38. A device-manufacturing method including a lithography process, the method comprising:

exposing a substrate using the microlithography system of claim 37; and processing the exposed substrate to form the device.

* * * * *